April 21, 1931.     C. W. ROBINSON ET AL     1,801,980
HOPPER FOR FERTILIZER DISTRIBUTORS
Filed Dec. 14 1928      2 Sheets-Sheet 1

Inventors
Charles W. Robinson
William C. Dwyer
By [signature]
Atty.

April 21, 1931.   C. W. ROBINSON ET AL   1,801,980
HOPPER FOR FERTILIZER DISTRIBUTORS
Filed Dec. 14 1928   2 Sheets-Sheet 2
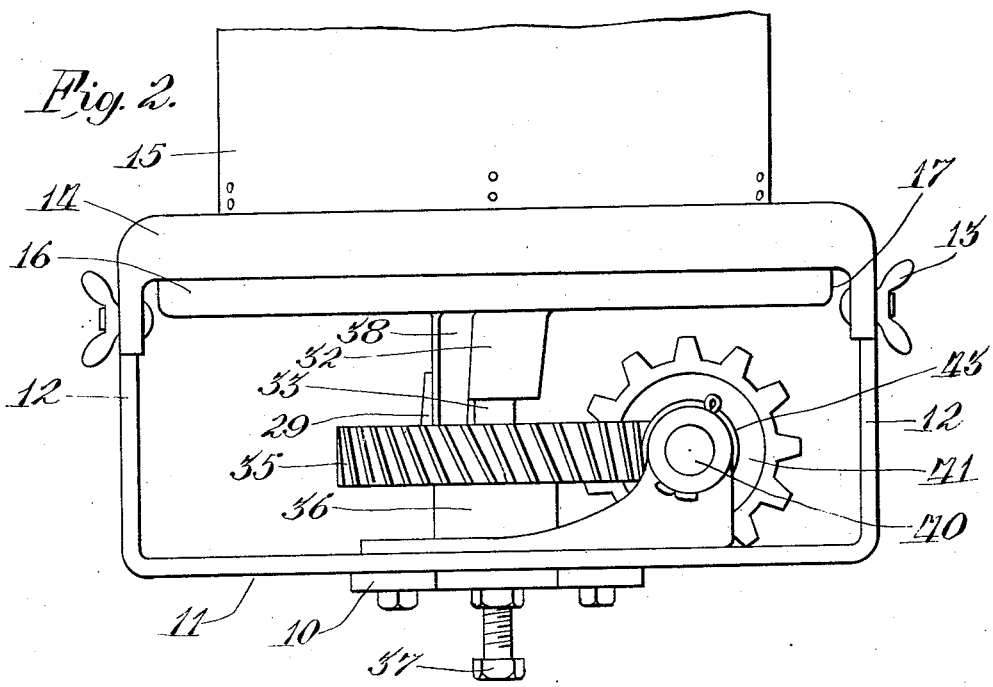
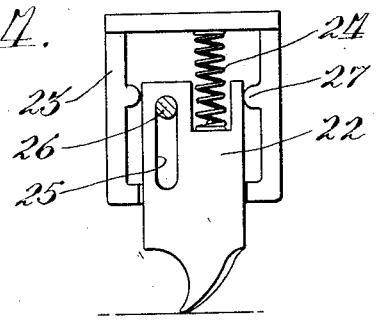
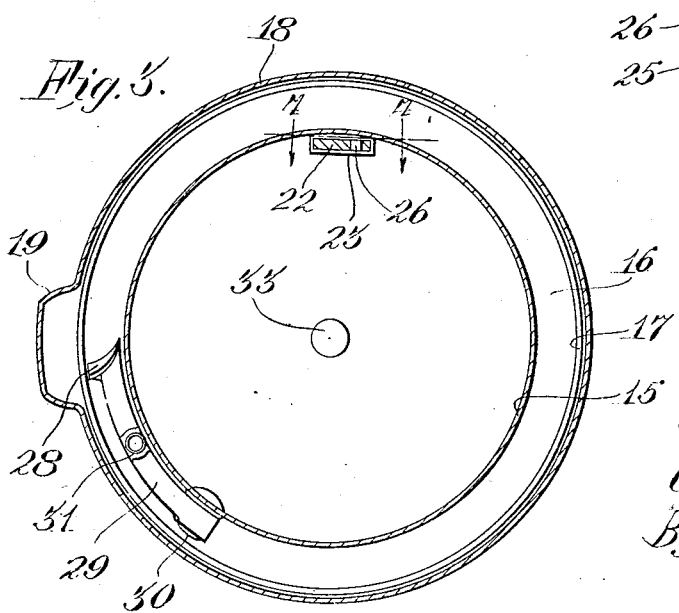
Inventors'
Charles W. Robinson
William C. Dwyer
By ...
Atty Patented Apr. 21, 1931

1,801,980

UNITED STATES PATENT OFFICE

CHARLES W. ROBINSON, OF HAMILTON, ONTARIO, CANADA, AND WILLIAM C. DWYER, OF AUBURN, NEW YORK, ASSIGNORS TO INTERNATIONAL HARVESTER COMPANY, A CORPORATION OF NEW JERSEY

HOPPER FOR FERTILIZER DISTRIBUTORS

Application filed December 14, 1928. Serial No. 325,967.

The present invention relates to a hopper construction for fertilizer distributing devices, and more particularly to improvements in the manner of adjusting the feed for varying the quantities to be discharged. The main object of the invention is to provide a simple and efficient structure which may be easily and accurately adjusted to vary the feeding aperture through which the material to be discharged must pass out of the container, and to make the adjusting element readily accessible and capable of fine adjustment.

The above and other minor objects and advantages will become apparent from the description hereinafter given and from the drawings forming a part of this application, wherein,—

Figure 2 is a side view from a direction at right angles to the view in Figure 1;

Figure 3 is a horizontal sectional view on the line 3—3 of Figure 1;

Figure 4 is a detail view of a material loosening element as viewed on the line 4—4 of Figure 3.

Figure 1:
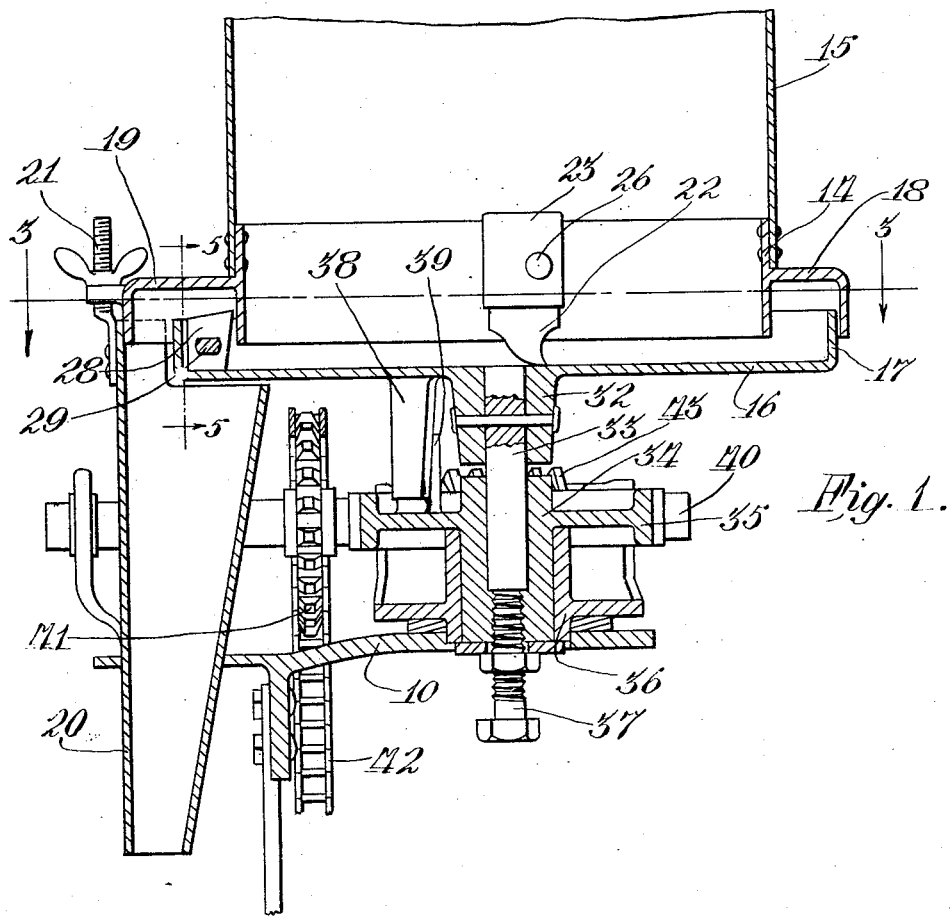
Figure 1 is a vertical section through the bottom of a hopper including the feeding mechanism comprising the invention.

The invention herein disclosed relates to mechanism for discharging granular fertilizing material from a container and is preferably designed for use in connection with fertilizer attachments to be applied to straddle row cultivators or other implements when it is desired to discharge a constant stream of fertilizing material to the ground as the machine progresses. In the present embodiment of the invention there is shown a supporting base or bracket 10, which has secured thereto a yoke 11, the upwardly extending arms 12 of which are fastened as by bolts 13 to an annular base casting 14. The base casting 14 forms the bottom edge or rim of a vertical can or container 15, the bottom of which is thus left open. The bottom of the container is faced or covered by a base plate 16 which is normally spaced a suitable distance below the bottom edge of the container to allow granular matter within the container to flow outwardly between said edge of the container and the plate. The base plate 16 is of somewhat greater diameter than that of the container 15 and is formed with an upstanding peripheral flange 17 which normally overlaps the lower edge of the container and is spaced a slight distance therefrom, as seen in Figure 1. The base casting 14, which constitutes the lower margin of the container, is formed with a circumferential skirt 18 overhanging the peripheral flange 17 on the base plate and enclosing the extended peripheral portion thereof.

Figure 5:
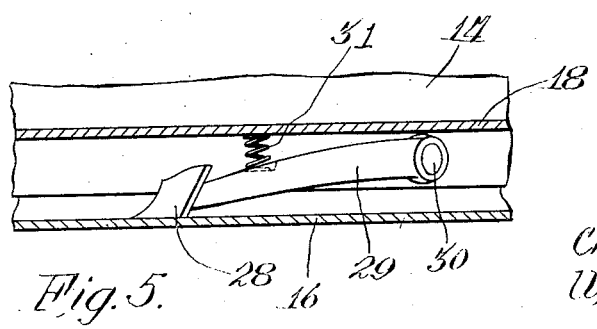
Figure 5 is a detail view on line 5—5 of Figure 1 of a discharge element seen in plan in Figure 3.

At one point in its circumference the skirt 18 is bowed outwardly, as at 19 (Figure 3), to provide a discharge space between the flange 17 on the base plate and the bowed portion of the skirt, which discharge opening communicates with a down spout 20 (Figure 1) serving to conduct the material towards the ground. A suspension bolt 21 serves to connect the spout 20 with the bowed portion 19 of the skirt. To prevent packing of the material and promote its discharge under the lower edge of the container, there is provided a loosening finger or plow 22 (Figure 4) which is carried in a bracket 23 secured to the casting 14. The finger 22 engages the base plate 16 under pressure of a coil spring 24 received between the bracket 23 and the upper end of the finger 22. The finger 22 is made vertically movable to follow adjustments of the base plate 16 by providing it with a slot 25 engaging a stud 26 in the bracket and by providing guide lugs 27, which are in engagement with the opposite vertical edge of the finger 22. In order to discharge the material passing into the peripheral portion of the base plate extending beyond the container, there is provided a lifting plow, or deflector, 28. This deflector is positioned in the space between the upright flange on the plate and the lower edge of the container at a point opposite the bowed portion 19 of the skirt. The deflector 28 is preferably carried on the end of an arm 29 which is pivoted to the container on a pintle 30 and resiliently held against the base plate by a coil spring 31 (Figure 5).

The base plate 16 is preferably formed with an integral hub or socket 32 at its center, and in this hub there is secured a vertical stub spindle 33 which is located on the vertical axis of the container. The spindle 33 is received in an elongated hub 34 forming part of a worm wheel 35. The hub 34 is journaled in a bearing 36 forming part of the supporting bracket 10. This hub is formed with a central cylindrical aperture in which the spindle 33 is seated. The lower end of the aperture is screw threaded to receive a set screw 37 on which the lower end of the spindle 33 rests. The under side of the base plate 16 is provided with a depending lug 38, and a cooperating upstanding lug 39 is provided on the worm wheel 35 for engagement with lug 38. The worm wheel 35 is preferably driven through a counter-shaft 40 having thereon a sprocket 41 which may be connected by a sprocket chain 42 with a source of power, such as the axle of the cultivator on which the attachment may be mounted. The counter-shaft 40 has a worm pinion 43 in geared connection with the wheel 35.

In operation the counter-shaft will be driven to rotate the gear wheel 35 in a counter-clockwise direction. Rotation of this wheel will carry with it the base plate 16 by reason of the driving engagement between the lugs 38 and 39.

Rotation of the base plate on which the material contained in the hopper will normally rest causes a certain amount of this material to flow under the lower edge of the container and into the peripheral portion of the base plate lying beyond the circumference of the container, this flow being maintained by the loosening and impelling action of the finger member 22. As the material is carried around to the plow 28, it will be raised or deflected upwardly by that element and caused to flow over the edge of the upright flange 17 and into the spout 20. When it is desired to increase or decrease the quantity of material passing into the peripheral portion of the base plate, this can readily be done by adjustment of the set screw 37. Turning this screw to right or left will cause raising or lowering of the base plate, thereby decreasing or increasing the space or outlet between it and the lower edge of the container. This adjustment can be made while the machine is in operation, and the construction is such that a delicate adjustment can be effected within a considerable range. The construction accordingly exemplifies one preferred embodiment of the invention wherein means is provided for readily effecting a delicate adjustment for the quantity of material being discharged from the container, the mechanism for effecting such adjustment being simple and composed of a minimum number of parts. It is contemplated that the preferred structure herein disclosed may be modified without departing from the spirit of the invention as defined in the following claims.

What is claimed is:

1. A hopper comprising a vertical container open at the bottom, a separate base plate facing the open bottom of the container, said plate having a central bearing spindle on its under side, a driving lug on the under side of said plate, a support for the hopper including a bearing bracket below the plate, a horizontal gear wheel having a hub journaled in said bracket, said hub having a central bearing receiving the spindle on the plate, a driving lug on said wheel in engagement with the lug on the plate, means for axially adjusting the spindle in its bearing to variably space the base plate from the container bottom, and means for driving the gear wheel.

2. A hopper comprising a vertical container open at the bottom, a separate base plate facing the open bottom of the container, said plate having a central bearing spindle on its under side, a driving lug on the under side of said plate, a support for the hopper including a bearing bracket below the plate, a horizontal gear wheel having a hub journaled in said bracket, said hub being formed with a central aperture therethrough receiving the spindle on the plate, the lower end of said aperture being threaded, an adjusting screw in the threaded portion of said aperture on which the end of said spindle rests, a vertical lug on said wheel in engagement with the lug on the plate, and means for driving the gear wheel.

3. A hopper comprising a vertical container open at the bottom, a separate base plate of larger diameter than the container facing the open bottom of the container and formed with a peripheral upstanding flange, said plate having a central bearing spindle on its under side, a skirt on the container overlapping said flange, means for supporting the hopper including a vertical bearing receiving said spindle, means for rotating the base plate, and means for axially adjusting the spindle in the bearing to variably space the base plate from the container bottom.

In testimony whereof we affix our signatures.

CHARLES W. ROBINSON.
WILLIAM C. DWYER.